Patented Jan. 15, 1946

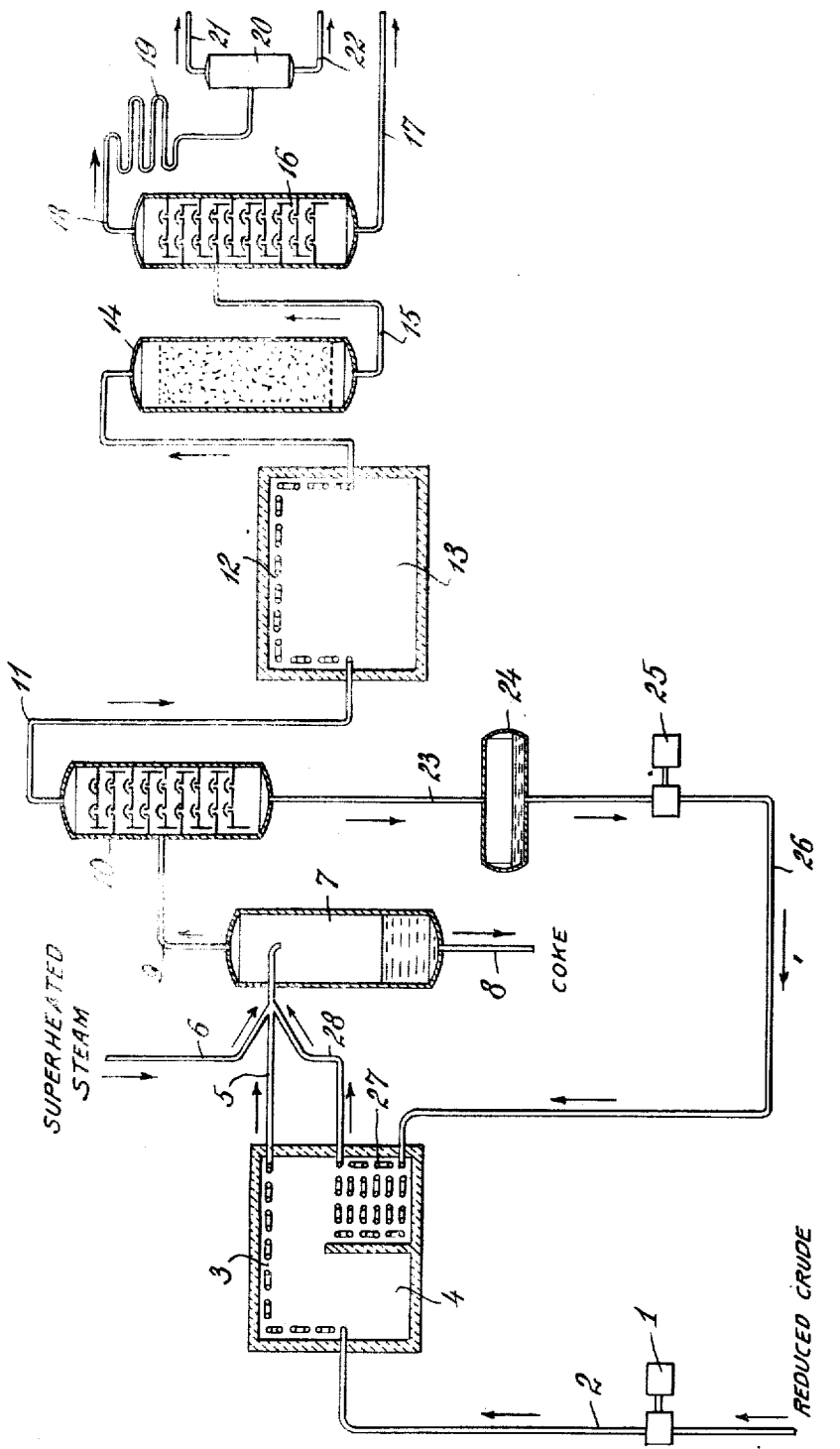

2,393,028

UNITED STATES PATENT OFFICE 2,393,028

CONVERSION OF HYDROCARBON OILS

George S. Dunham, Merion, Pa., assignor to Socony-Vacuum Oil Company, Incorporated, New York, N. Y., a corporation of New York Application August 8, 1941, Serial No. 405,901

3 Claims. (Cl. 196—52)

This application is a continuation-in-part of my prior filed application Serial No. 279,020, filed September 29, 1939.

This invention has to do with methods for the conversion of hydrocarbon oils utilizing vapor phase catalytic cracking in the presence of a clay like catalyst in particle form which catalyst is regenerated in situ.

The usual method of operating such processes contemplates preparing a charging stock of the nature of gas oil, no substantial portion of which boils above about 700° F. at atmospheric pressure, superheating such charge to about 850° F. and passing the heated vapors through a chamber containing a catalyst. The catalyst is principally composed of hydrated aluminum silicates, in the form of pellets, particles or granules. In the catalyst chamber the vapors are cracked to yield gasoline, uncracked vapors, and a carbonaceous material or coke which is deposited upon the catalyst. The vapor effluent from the cracking is fractionated to separate gases, gasoline, and condensed uncracked gas oil. The catalyst chamber is periodically withdrawn from operation, another one being substituted for continuity of operation, and the catalyst in the withdrawn chamber is regenerated in situ by burning off the coke in a current of heated air. Such processes are fully explained in the various United States patents of Eugene Houdry and associates.

Now, for any selected conversion rate, the amount of coke laid down upon the catalyst per unit volume of vapors charged to catalyst determines not only the length of run before regeneration is necessary but also the amount of time which must be consumed in regeneration; time spent in regeneration is idle time from the standpoint of cycle efficiency; and the amount of coke so laid down increases quite rapidly with increases in the percentage of charge to catalyst boiling above about 700° F. at atmospheric pressure. Consequently, every effort is made to prepare the charge stock so that the heated vapors which are passed into the catalyst to be cracked therein will contain no substantial amount of constituents boiling above about 700° F. at atmospheric pressure. The usual method of performing the preparation is by subjecting the charge oil to a distillation and fractionation to prepare a charge vapor of proper end point which is then superheated before passing to the catalyst.

Where reduced crude is utilized for the original charge, this reduced crude, containing both gas oil and materials boiling above about 700° F. at atmospheric pressure, must be prepared by heating and vaporizing it to separate therefrom charge materials of proper boiling point, leaving the remainder as a heavy viscous tar of little value. To avoid the production of large amounts of this tar it is advisable to heat the reduced crude before vaporization to such a temperature that upon vaporization under proper conditions there is left unvaporized a minimum amount of residue in the form of coke, or in the form of a pitch or liquid asphalt the yield of which is the same or not greatly in excess of the amount of coke which would be produced by coking distillation of the reduced crude. It is also advisable to conduct such distillation with a minimum of cracking, to avoid producing from the tar materials which are in the catalytic cracking charge boiling range but not chemically desirable for such conversion. The desirable operation is one which reduces the crude charge to as little residue as possible, while making every effort to avoid cracking during such reduction. While the vapors from such distillation contain a considerable amount of material too high in boiling point to be charged to the catalyst, fractionation of the vapors to remove this material yields a condensate of considerably higher value than the tar formerly produced. The process still does not permit full utilization of the original crude for catalytic cracking.

This invention has for its object the provision of a process whereby, while rejecting a minimum residue from a reduced crude charge oil, the entire remainder of the oil is converted into materials suitable for charge to a catalytic vapor phase process. As a corollary object it provides for the production of an increased yield of catalytically cracked gasoline from a given amount of crude charge oil. Further, it provides a process of such a nature that the material subjected to said catalytic vapor phase cracking has a considerably decreased tendency to deposit coke upon the catalyst during such catalytic cracking. In its broadest aspect, it has for an object the provision of a combined process for preparation and pretreatment of charging stock and of catalytic cracking, each so associated with the other as to provide a maximum flexibility with regard to nature of original charging stock combined with a minimum variation in the operation and nature of products of the catalytic cracking.

To more readily understand this invention, reference is made to the drawing attached to this specification the single figure of which shows in diagrammatic form the apparatus and process steps appropriate to my process.

In the drawing, reduced crude charge, freed of fractions lighter than gas oil by preceding distillation operations, is forced by pump 1 through pipe 2 and coils 3 in furnace 4 to be discharged through pipe 5 in admixture with superheated steam supplied by pipe 6 into coking vessel 7. In vessel 7 there is deposited a coke, pitch, or liquid asphalt, the removal of which from the system is indicated by pipe 8. Overhead vapors from 7 pass through pipe 9 to fractionator 10. Prepared charge vapor, from which undesirable heavy material has been condensed and separated in fractionator 10 passes through pipe 11 and coil 12 in furnace 13 to enter catalyst case 14, wherein it is cracked as before explained. Passing from case 14 through pipe 15, the cracked vapors enter fractionator 16 to be separated into uncracked product which departs through pipe 17 and cracked products which pass through pipe 18 and condenser 19 to separator 20 from which non-condensible gases are withdrawn at 21 and cracked product at 22. While only one catalyst case 14 is shown, it is understood that there are a sufficient number of catalyst bodies, so manifolded, that vapors may be sent to another catalyst body when any one body is withdrawn from the circuit for regeneration.

Returning to fractionator 10, the heavy material boiling from 700° F. and upwards at atmospheric pressure which was separated therein is removed at pipe 23. This heavy condensate I collect in accumulator 24 and force by means of pump 25 and pipe 26 through coil 27 situated in furnace 4, where the heavy material is viscosity broken, that is, subjected to a mild cracking sufficient to convert a major portion of the material boiling above 700° F. to material of gas oil nature boiling below 700° F. The material so treated then passes to separator vessel 7, where vapor separation takes place in company with the incoming material from pipe 5 and the superheated steam from pipe 6. This vaporization of the stream from viscosity breaker coil 27 not only separates that material into vapor and a product corresponding in nature to the minimum residue of coke, pitch, or asphalt being simultaneously separated out of the stream from coil 3 and pipe 5, but it also assists in effecting a more complete separation of the material from pipe 5. This is because of the presence in separator 7 of an amount of vapors boiling below 700° F., due entirely to the viscosity breaking operation, far in excess of that proportion of such vapors arising from the normal operation in coil 3. These vapors assist in getting a more complete separation of the minimum residue from the charge oil by permitting vaporization to a lower percentage bottoms for a given temperature. The presence of these vapors from the viscosity breaking operation, as well as the superheated steam from pipe 6, permits of carrying the distillation of the reduced crude to a desired minimum residue, without cracking in coil 3, at temperatures for coil 3 exit which are far below those which would be necessary for such distillation to similar minimum residue in the absence of the carrying power of these added materials. As is well known in the art, distillation to coke or a similar minimum residue, in the absence of such carrying materials, involves times and temperatures giving rise to fairly extensive cracking of the material treated, which may be wholly avoided, with production of residues similar in amount, by the method here shown.

The vaporous products of viscosity breaking, both those newly formed products boiling below about 700° F. and those yet boiling above that range, pass into fractionator 10 and are therein freed from products undesirable for catalytic cracking because of high boiling point. The suitable vapors remain in the main vapor stream of the process, while the high boiling material returns to coil 27 for retreatment. In this manner, the whole of the reduced crude charge becomes converted into charge vapor for catalyst and a minimum residue. This minimum residue, whether it be coke, pitch, or asphalt, represents only a few percent of the original charge, the yield being of about the same order as would be the yield of coke were the original charge subjected to a dry or coking distillation. Since the whole of the remainder passes through the catalyst a greatly increased yield of catalytically cracked product is gotten over those operations where a tar fraction is rejected from the system.

While viscosity breaking in connection with thermal cracking operations is known, as are various methods of reducing crude charging stock to a minimum residue, the methods developed therein are not capable of direct transfer to catalytic cracking, since, due to the far greater tolerance of thermal cracking methods for coke formed during conversion, the methods so developed have not been forced to be capable of producing a charging stock of the highly coke-free characteristics demanded by catalytic vapor phase cracking.

It is true that viscosity breaking operations have heretofore been associated with catalytic cracking, as in U. S. Patent 2,087,268 to Sheldon, but it is significant that there was no attempt made therein to reduce the crude charge stock beyond a tar roughly the equivalent of that produced by ordinary fractionation of desirable charging stock from reduced crude. Indeed, it has been thought heretofore that it would not be practicable to accomplish complete separation of a reduced crude charge into a material wholly acceptable as charge for catalytic vapor phase cracking and a minimum residue not differing greatly in amount from the coke ordinarily produced by coking distillation of a crude of the same nature.

My process herein disclosed is capable not only of providing such a complete separation of reduced crude charge into a minimum residue and products capable of being catalytically converted in vapor phase without undue deposition of coke, but also it avoids the production of an undue amount of thermally cracked product of gasoline boiling point. Since thermally cracked gasoline is not of the high octane quality attained by catalytic product, this is quite desirable. Further my process, since it increases the relative concentration of vapors boiling below about 700° F. at the point where the minimum residue is separated, that is in vapor separator 7 of the drawing, materially assists in the reduction of the charge to the desired minimum residue.

In general, the temperature, time, and pressure conditions in the several phases of my process will not differ materially from those already established for similar steps of process. The temperature and time conditions for the viscosity breaking should be adjusted, however, so as to couple a maximum production of material boiling below about 700° F. with a minimum production of material of gasoline boiling point. In general, temperatures of about 900° F. or more will be used at the exit of coil 3 as a maximum when no carrying material such as steam and vapors from coil 27 are being used, this temperature being reduced, as is known in the art, proportionately to the carrying power of the vapors, etc., present to accomplish the desired distillation without substantial cracking in coil 3, temperatures of about 900° F. coupled with suitable time, as is known in the art, will be used in the viscosity breaking coil, and temperatures of the order of 850° F. will be used in the catalytic cracking.

The term "minimum residue," where used herein, refers to a residue, either coke, pitch, or liquid asphalt, which residue, in amount, is of the order of that amount of coke which would be formed by a coking distillation of the reduced crude charging stock.

I claim:

1. That method for preparing a charge stock for vapor phase catalytic cracking from a crude oil from which constituents lighter than gas oil have been removed comprising heating such crude and vaporizing it in the presence of carrying vapors, the proportioning of carrying vapors being such that all portions of the crude other than a minimum residue are vaporized without heating the crude to temperatures conducive to substantial cracking thereof, fractionating the vapors to condense therefrom portions too heavy for catalytic cracking charge, subjecting the condensate so formed to viscosity breaking in the absence of residual portions of the crude to convert a substantial portion thereof to material suitable for catalytic cracking charge while minimizing production of gasoline in such viscosity breaking, vaporizing the exit stream from this viscosity breaking in company with the exit stream from reduced crude distillation to provide a substantial portion of the carrying vapors therefor, discarding the residues produced by such combined vaporization from the system, and passing the vapors so produced to the said fractionating step.

2. That method of preparing charge material of gas oil nature and having an end point not substantially above about 700° F., suitable as charge for vapor phase catalytic cracking operations to produce cracked gasoline, comprising heating a crude oil from which materials lighter than gas oil have been removed to a temperature insufficient to bring about substantial cracking of the heaviest portions thereof and vaporizing the crude in the presence of carrying vapors sufficient in amount to distill it to a minimum residue which is withdrawn from the system, fractionating the combined vapors to condense therefrom substantially all materials boiling above a 700° F. endpoint, viscosity breaking such condensate in the absence of residual portions of the crude under conditions suitable for a maximum conversion thereof to materials boiling under 700° F. while minimizing conversion to gasoline, and utilizing the exit stream from this viscosity breaking to provide a substantial portion of the carrying vapors for the distillation of the heated reduced crude.

3. That method of preparing and converting material of gas oil nature and having an end point not substantially above about 700° F., suitable as charge for vapor phase catalytic cracking operations to produce cracked gasoline, comprising heating a crude oil from which materials lighter than gas oil have been removed to a temperature insufficient to bring about substantial cracking of the heaviest portions thereof and vaporizing the crude in the presence of carrying vapors sufficient in amount to distill it to a minimum residue which is withdrawn from the system, fractionating the combined vapors to condense therefrom substantially all materials boiling above a 700° F. endpoint, viscosity breaking such condensate in the absence of residual portions of the crude under conditions suitable for a maximum conversion thereof to materials boiling under 700° F. while minimizing conversion to gasoline, utilizing the exit stream, superheating the overhead vapors from the fractionating operation to a temperature in excess of about 800° F. and passing them through a contact mass capable of catalyzing vapor phase cracking to produce a substantial yield of gasoline therefrom.

GEORGE S. DUNHAM.

---

CERTIFICATE OF CORRECTION.

Patent No. 2,393,028.   January 15, 1946.

GEORGE S. DUNHAM.

It is hereby certified that error appears in the printed specification of the above numbered patent requiring correction as follows: Page 1, first column, line 2, for "Serial No. 279,020" read --Serial No. 297,020--; and that the said Letters Patent should be read with this correction therein that the same may conform to the record of the case in the Patent Office.

Signed and sealed this 9th day of April, A. D. 1946.

Leslie Frazer (Seal)   First Assistant Commissioner of Patents.

point. In general, temperatures of about 900° F. or more will be used at the exit of coil 3 as a maximum when no carrying material such as steam and vapors from coil 27 are being used, this temperature being reduced, as is known in the art, proportionately to the carrying power of the vapors, etc., present to accomplish the desired distillation without substantial cracking in coil 3, temperatures of about 900° F. coupled with suitable time, as is known in the art, will be used in the viscosity breaking coil, and temperatures of the order of 850° F. will be used in the catalytic cracking.

The term "minimum residue," where used herein, refers to a residue, either coke, pitch, or liquid asphalt, which residue, in amount, is of the order of that amount of coke which would be formed by a coking distillation of the reduced crude charging stock.

I claim:

1. That method for preparing a charge stock for vapor phase catalytic cracking from a crude oil from which constituents lighter than gas oil have been removed comprising heating such crude and vaporizing it in the presence of carrying vapors, the proportioning of carrying vapors being such that all portions of the crude other than a minimum residue are vaporized without heating the crude to temperatures conducive to substantial cracking thereof, fractionating the vapors to condense therefrom portions too heavy for catalytic cracking charge, subjecting the condensate so formed to viscosity breaking in the absence of residual portions of the crude to convert a substantial portion thereof to material suitable for catalytic cracking charge while minimizing production of gasoline in such viscosity breaking, vaporizing the exit stream from this viscosity breaking in company with the exit stream from reduced crude distillation to provide a substantial portion of the carrying vapors therefor, discarding the residues produced by such combined vaporization from the system, and passing the vapors so produced to the said fractionating step.

2. That method of preparing charge material of gas oil nature and having an end point not substantially above about 700° F., suitable as charge for vapor phase catalytic cracking operations to produce cracked gasoline, comprising heating a crude oil from which materials lighter than gas oil have been removed to a temperature insufficient to bring about substantial cracking of the heaviest portions thereof and vaporizing the crude in the presence of carrying vapors sufficient in amount to distill it to a minimum residue which is withdrawn from the system, fractionating the combined vapors to condense therefrom substantially all materials boiling above a 700° F. endpoint, viscosity breaking such condensate in the absence of residual portions of the crude under conditions suitable for a maximum conversion thereof to materials boiling under 700° F. while minimizing conversion to gasoline, and utilizing the exit stream from this viscosity breaking to provide a substantial portion of the carrying vapors for the distillation of the heated reduced crude.

3. That method of preparing and converting material of gas oil nature and having an end point not substantially above about 700° F., suitable as charge for vapor phase catalytic cracking operations to produce cracked gasoline, comprising heating a crude oil from which materials lighter than gas oil have been removed to a temperature insufficient to bring about substantial cracking of the heaviest portions thereof and vaporizing the crude in the presence of carrying vapors sufficient in amount to distill it to a minimum residue which is withdrawn from the system, fractionating the combined vapors to condense therefrom substantially all materials boiling above a 700° F. endpoint, viscosity breaking such condensate in the absence of residual portions of the crude under conditions suitable for a maximum conversion thereof to materials boiling under 700° F. while minimizing conversion to gasoline, utilizing the exit stream, superheating the overhead vapors from the fractionating operation to a temperature in excess of about 800° F. and passing them through a contact mass capable of catalyzing vapor phase cracking to produce a substantial yield of gasoline therefrom.

GEORGE S. DUNHAM.

---

CERTIFICATE OF CORRECTION.

Patent No. 2,393,028. January 15, 1946.

GEORGE S. DUNHAM.

It is hereby certified that error appears in the printed specification of the above numbered patent requiring correction as follows: Page 1, first column, line 2, for "Serial No. 279,020" read --Serial No. 297,020--; and that the said Letters Patent should be read with this correction therein that the same may conform to the record of the case in the Patent Office.

Signed and sealed this 9th day of April, A. D. 1946.

Leslie Frazer (Seal)    First Assistant Commissioner of Patents.